(12) United States Patent
Noriega

(10) Patent No.: US 9,150,047 B2
(45) Date of Patent: Oct. 6, 2015

(54) DEEP-LIP WHEEL COVER

(71) Applicant: Frank Thomas Noriega, Pico Rivera, CA (US)

(72) Inventor: Frank Thomas Noriega, Pico Rivera, CA (US)

( * ) Notice: Subject to any disclaimer, the term of this patent is extended or adjusted under 35 U.S.C. 154(b) by 0 days.

(21) Appl. No.: 14/177,048

(22) Filed: Feb. 10, 2014

(65) Prior Publication Data

US 2014/0152078 A1  Jun. 5, 2014

Related U.S. Application Data

(63) Continuation-in-part of application No. 12/693,426, filed on Jan. 25, 2010, now abandoned.

(60) Provisional application No. 61/147,039, filed on Jan. 23, 2009.

(51) Int. Cl.
| | |
|---|---|
| *B60B 7/00* | (2006.01) |
| *B60B 7/06* | (2006.01) |
| *B60B 1/06* | (2006.01) |
| *B60B 7/04* | (2006.01) |
| *B60B 7/10* | (2006.01) |
| *B60B 7/14* | (2006.01) |
| *B60B 7/08* | (2006.01) |

(52) U.S. Cl.
CPC . *B60B 7/065* (2013.01); *B60B 1/06* (2013.01); *B60B 7/0013* (2013.01); *B60B 7/04* (2013.01); *B60B 7/063* (2013.01); *B60B 7/068* (2013.01); *B60B 7/08* (2013.01); *B60B 7/10* (2013.01); *B60B 7/14* (2013.01); *B60B 2900/112* (2013.01); *B60B 2900/572* (2013.01)

(58) Field of Classification Search
CPC ............ B60B 7/00; B60B 7/008; B60B 7/06; B60B 7/061; B60B 7/063; B60B 7/065; B60B 7/066; B60B 7/08; B60B 7/14; B60B 3/147

USPC ............ 301/35.629, 35.631, 35.632, 37.101, 301/37.28, 37.102, 37.31, 37.371, 37.106, 301/37.108
See application file for complete search history.

(56) References Cited

U.S. PATENT DOCUMENTS

| | | | |
|---|---|---|---|
| 1,976,542 A | 10/1934 | Clarke | |
| 1,985,908 A | 1/1935 | Zerk | |
| 2,212,039 A | 8/1940 | Lyon | |
| 3,095,241 A | 6/1963 | Fitzgerald | |
| 3,496,753 A | 2/1970 | Gibbings | |
| 3,798,728 A | 3/1974 | Beisch | |
| 3,869,174 A * | 3/1975 | Brown et al. | 301/35.629 |
| 4,787,681 A | 11/1988 | Wang et al. | |
| 5,362,134 A | 11/1994 | Carmona | |
| 6,712,432 B1 | 3/2004 | Cheng | |
| 6,805,413 B2 | 10/2004 | Fitzgerald | |
| 7,264,316 B2 | 9/2007 | DiMarco et al. | |
| 7,600,824 B2 * | 10/2009 | Dagh et al. | 301/37.36 |
| 8,147,003 B2 * | 4/2012 | Bruce | 301/37.102 |
| 2004/0070259 A1 * | 4/2004 | Chuang | 301/37.101 |
| 2009/0021071 A1 * | 1/2009 | Kinslow et al. | 301/37.31 |
| 2014/0152079 A1 * | 6/2014 | Vickers et al. | 301/37.102 |

* cited by examiner

*Primary Examiner* — Jason Bellinger

(57) ABSTRACT

A deep-lip wheel cover apparatus that attaches with a steel wheel includes a wheel cover, a center cap, and a hub ring. The hub ring is centrally connected with the steel wheel so that the wheel cover and the center cap can be attached to the hub ring. The wheel cover also attaches with the steel wheel through a plurality of fastening systems, where the plurality of fastening system provide additional connection points in between the wheel cover and the steel wheel. When the wheel cover and the center cap are installed within the steel wheel, the wheel cover and the center cap completely cover the steel wheel creating a deep-lip appearance within the steel wheel.

21 Claims, 19 Drawing Sheets

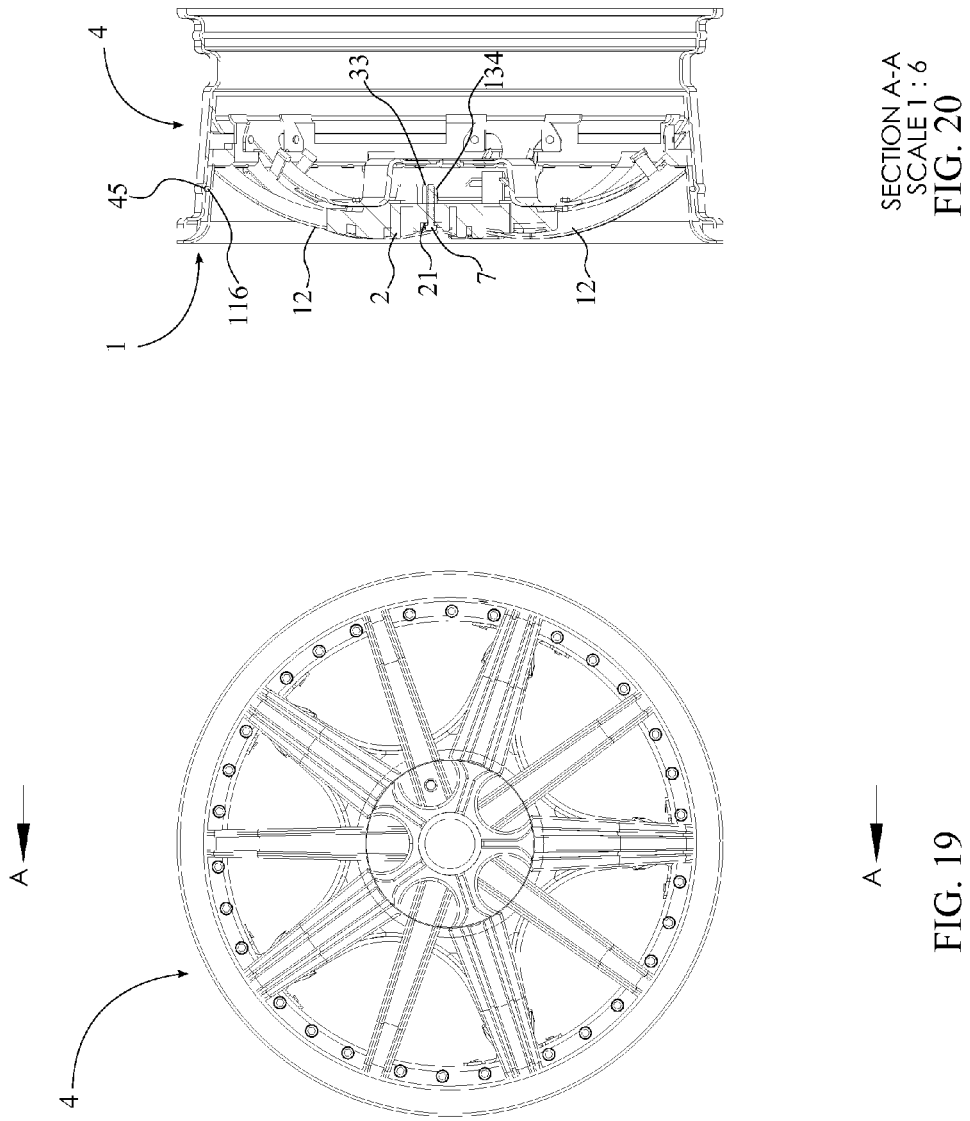

DEEP-LIP WHEEL COVER

The current application is a continuation-in-part of and claims a priority to Ser. No. 12/693,426 filed on Jan. 25, 2010 which claims a priority to 61/147,039 filed on Jan. 23, 2009.

FIELD OF THE INVENTION

The present invention relates generally to a wheel cover apparatus. More specifically, the present invention is an interchangeable and decorative wheel cover that attaches with universal wheel designs.

BACKGROUND OF THE INVENTION

Efforts have been made in the past to improve the appearance of original equipment automotive steel or aluminum wheels. Such attempts have included colorizing or coating the wheel, physically augmenting the wheel, affixing a hub cap or wheel cover on the wheel, adding trim to the wheel, and replacing the wheel itself. Conventional OEM wheels or aluminum wheels can be painted or plated to enhance their appearance. These methods require considerable effort and have a limited result in enhancing the overall appearance of such wheels. Other efforts to improve the appearance of a conventional wheel have led to the attachment of an exterior plate or a series of plates by mounting them with the lugs; however, such plates are intended to increase the width of the wheel making it appear more massive and bulky. Further efforts to camouflage the appearance of a rudimentary automobile wheel have leg to the incorporation of the caps or covers, where the caps or covers can be plastic, metal, or wire spokes. The plastic caps are typically formed by injection molding, and the metal caps are formed by casting or blanking and drawing operation. Such caps or covers often suffer the shortcoming that they present little more than surface decoration providing little in the way of optical illusion persuasive of a faithful reproduction of a cast wheel. With reference to the adding trim to the wheel, the wheel trim is often employed in an effort to make the hub cap or the wheel appear wider and can be configured to obscure from view the junction between the tire and the wheel. Often times, consumers are driven to replace the entire wheel in a quest for stylish transport. Previous solutions in the nature of augmenting the wheel sometimes presented a flimsy and visually unappealing wheel design. Thus, various forms of decorative automobile wheels themselves have been proposed. Aftermarket automobile wheels are typically cast aluminum or stamped and rolled wheels. For the cast aluminum wheel, the surface to be exposed to the view is chrome plated or machined with a lathe cutting tool to remove rough edges and provide a smooth texture and luster. The lathing process leaves spiral marking indicative of the process. A machined cast wheel has a unique appearance that is valued by consumers, but the decorative chrome plated or machine wheels are expensive to manufacture and finish. The cast of making even the least expensive decorative machined cast wheel can be four times that for steel wheel augmented by other methods of appearance augmentation, such as wheel covers or wheel caps. Decorative automobile wheels are also bulky, heavy, and cumbersome to package and transport to retail outlets, thus, consumers are faced with the choice of an expensive machined cast wheels or inexpensive and less attractive devices. These inexpensive and less attractive devices do not have the improved appearance of the machined cast wheels. They also lack the high quality appearance that normally associates with a high-end machined cast wheels. Ordinary wheel covers have not achieved a resemblance to quality chrome plated or machined wheels that would give a consumer an inexpensive alternative to the expensive chrome plated or machined cast wheels. Such wheel covers lack the depth and features required to satisfactorily replicate the visual, dimensional appeal of an expensive alloy wheel.

It is therefore an objective of the present invention to provide an interchangeable and decorative wheel cover that creates the illusion of a deep lip within the conventional wheel. The present invention also provides multiple attachment methods so that the interchangeable and decorative wheel cover can be efficiently and firmly secured with the conventional wheel. The present invention completely covers the conventional wheel while creating expensive machined cast wheel appearance within the conventional wheel.

BRIEF DESCRIPTION OF THE DRAWINGS

FIG. 19 is a front view of the steel wheel, the wheel cover, and the center cap of the present invention, showing the plane upon which a cross sectional view is taken shown in FIG. 20.

FIG. 20 is a cross section view of the steel wheel, the wheel cover, and the center cap taken along line A-A of FIG. 19, showing the attachment of the second fastener.

DETAIL DESCRIPTIONS OF THE INVENTION

All illustrations of the drawings are for the purpose of describing selected versions of the present invention and are not intended to limit the scope of the present invention.

The present invention is a deep-lip wheel cover that can be attached to a deep-lip steel wheel so that the present invention is able to interchangeably customize the deep-lip wheel rim upon user's discretion. The present invention, which comprises a wheel cover 1, a center cap 2, and a hub ring 3, is generally attached to a steel wheel 4, where the steel wheel 4 functions as the deep-lip steel wheel, without the drop center interference. The present invention fully covers the steel wheel 4 in such way that the steel wheel 4 is completely hidden behind the wheel cover 1 and the center cap 2.

Figure 1:
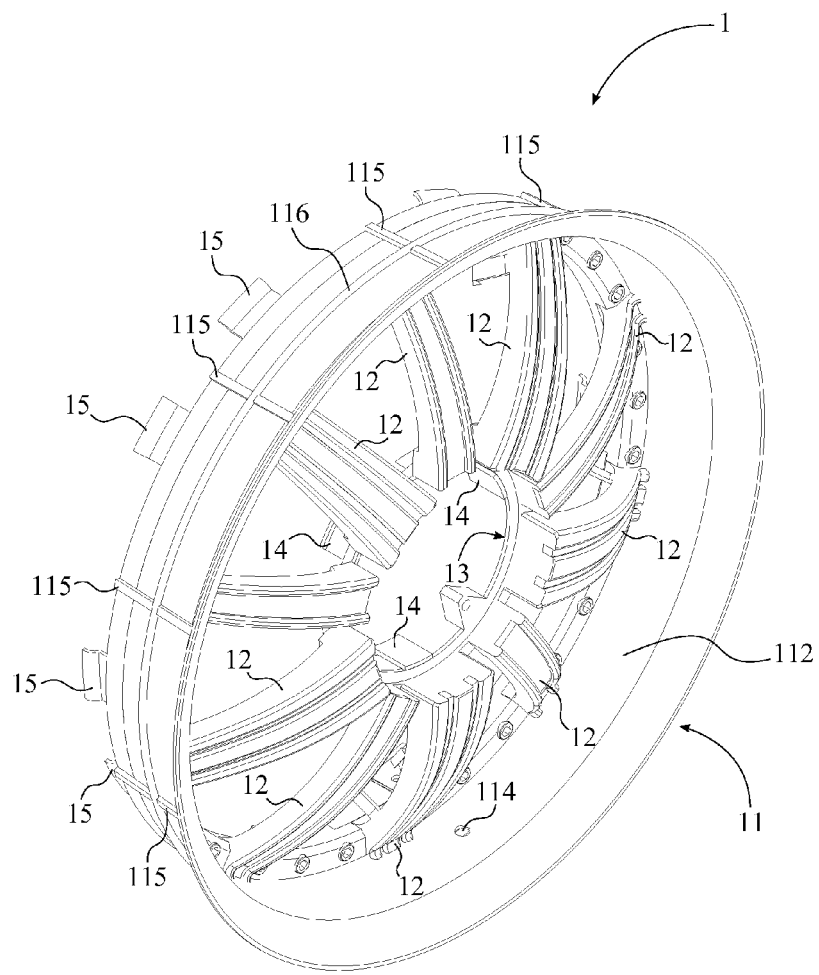
FIG. 1 is a perspective view of the wheel cover of the present invention.

In reference to FIG. 1, the general configuration of the present invention utilizes the wheel cover 1 that comprises a brim 11, a plurality of cover spokes 12, and a central flange 13, the center cap 2, and the hub ring 3. More specifically, the plurality of cover spokes 12 is radially connected around the central flange 13, and the brim 11 is concentrically positioned around the central flange 13 so that the plurality of cover spokes 12 is able to connect with the brim 11. The center cap 2 and the hub ring 3 are concentrically positioned with the wheel cover 1, where the wheel 1 cover is mounted against the hub ring 3 and the center cap 2 is mounted into the central flange 13 opposite the hub ring 3.

In reference to FIG. 1, the wheel cover 1 further comprises a plurality of hub securing clips 14, a plurality of flange securing clips 15, and a plurality of fastening systems 16. The wheel cover 1 can be made from high strength and lightweight materials, such as plastic, composite material, metal or combination of thereof. The brim 11, which is the outer circular section of the wheel cover 1, comprises an annular protrusion 111, an extended outer lip 112, an inner lip edge 113, a valve stem hole 114, a plurality of ribs 115, and an annular locking ring 116. The annular protrusion 111 is perimetrically connected to the extended outer lip 112, where the annular protrusion 111 is adjacently positioned with the inner lip edge 113. More specifically, the annular protrusion 111 is concentrically positioned within the extended outer lip 112 and perpendicularly positions with the extended outer lip 112. The annular protrusion 111 functions as a supporting structure within the brim 11 so that the extended outer lip 112 is able to maintain its circular shape within the present invention eliminating any kind of deformations. Additionally, the extended outer lip 112 of the present invention comprises a lip portion and a flange portion, where the lip portion is adjacently positioned with the annular protrusion 111 and the flange portion is adjacently positioned with the lip portion opposite of the annular protrusion 111. The valve stem hole 114 is traversed through the extended outer lip 112 in such way that the valve stem hole 114 provides an opening for a valve stem of a wheel assembly. The plurality of ribs 115 is externally and radially connected around the extended outer lip 112. More specifically, the plurality of ribs 115 extends from the inner lip edge 113 to the front side of the extended outer lip 112, wherein each of the plurality of ribs 115 is equally spaced from each other around the extended outer lip 112. The annular locking ring 116 is externally connected around the extended outer lip 112 and the plurality of ribs 115 in such way that the annular locking ring 116 is concentrically positioned with the extended outer lip 112.

Figure 2:
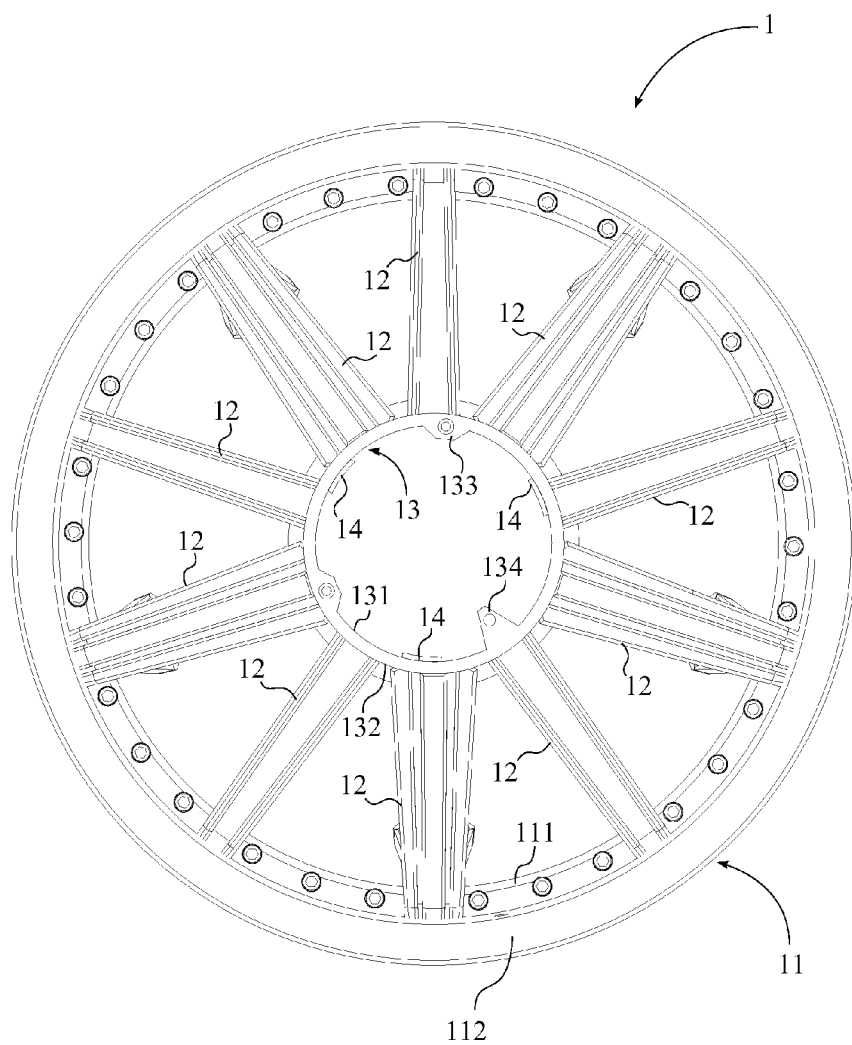
FIG. 2 is a front view of the wheel cover of the present invention.

In reference to FIG. 2, the central flange 13, which is the central section of the wheel cover 1, is concentrically positioned within the extended outer lip 112. The central flange 13 comprises an inner edge 131, an outer edge 132, a first securing tab 133, and a second securing tab 134. The inner edge 131 is positioned concentric to the outer edge 132 as the inner edge 131 and the outer edge 132 complete the body of the central flange 13. The first securing tab 133 is perpendicularly positioned with the inner edge 131 and adjacently connected to the inner edge 131. Similarly, the second securing tab 134 is perpendicularly positioned with the inner edge 131 and adjacently connected to the inner edge 131. In reference to FIG. 1-FIG. 3, the plurality of cover spokes 12, which is the intermediate section of the wheel cover 1, is radially connected in between the outer edge 132 and the annular protrusion 111. More specifically, the plurality of cover spokes 12 connects both the brim 11 and the central flange 13 together within the wheel cover 1. Exterior surfaces of the plurality of cover spokes 12 can be shaped into many different geometric shapes and designed with many different colors or designs, as long as the plurality of cover spokes 12 is able to cover the intermediate section of the steel wheel 4. The Even though a circular shaped central flange 13 is shown with the preferred embodiment of the present invention, the central flange 13 can be any other geometric shapes within the present invention.

Figure 3:
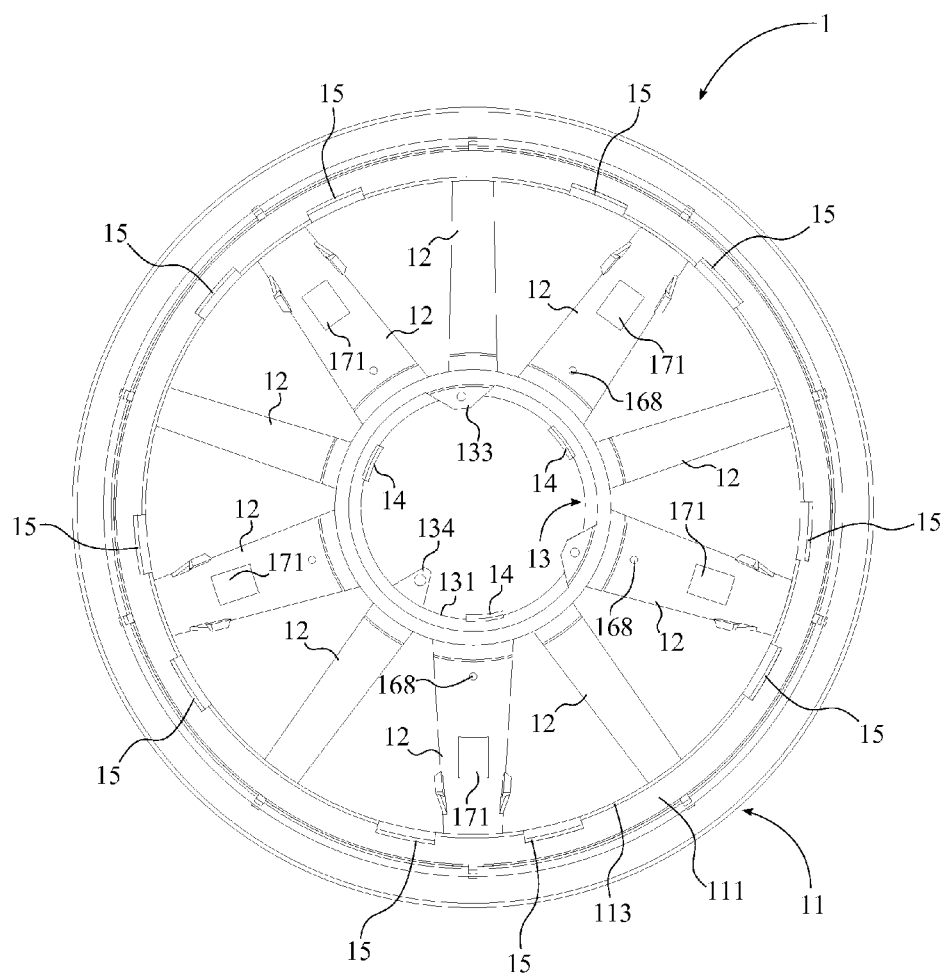
FIG. 3 is a back view of the wheel cover of the present invention.
Figure 4:
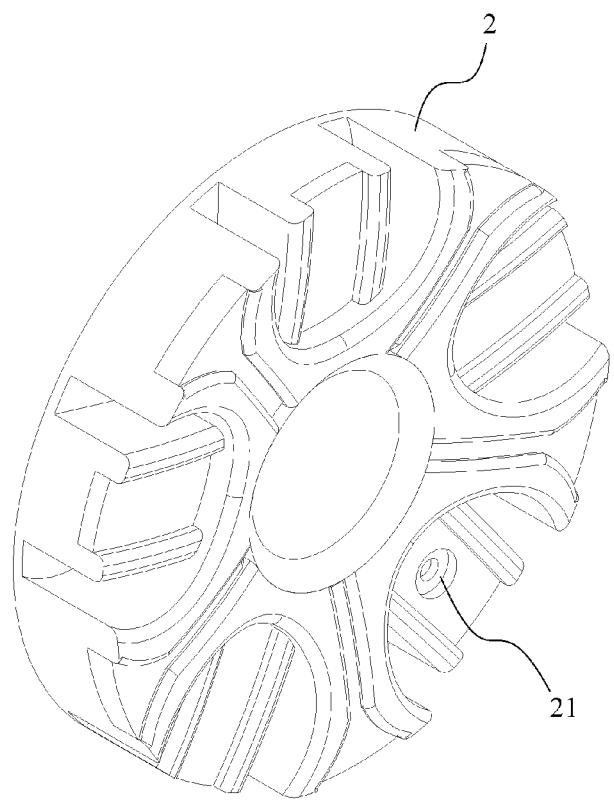
FIG. 4 is a perspective view of the center cap of the present invention.
Figure 5:
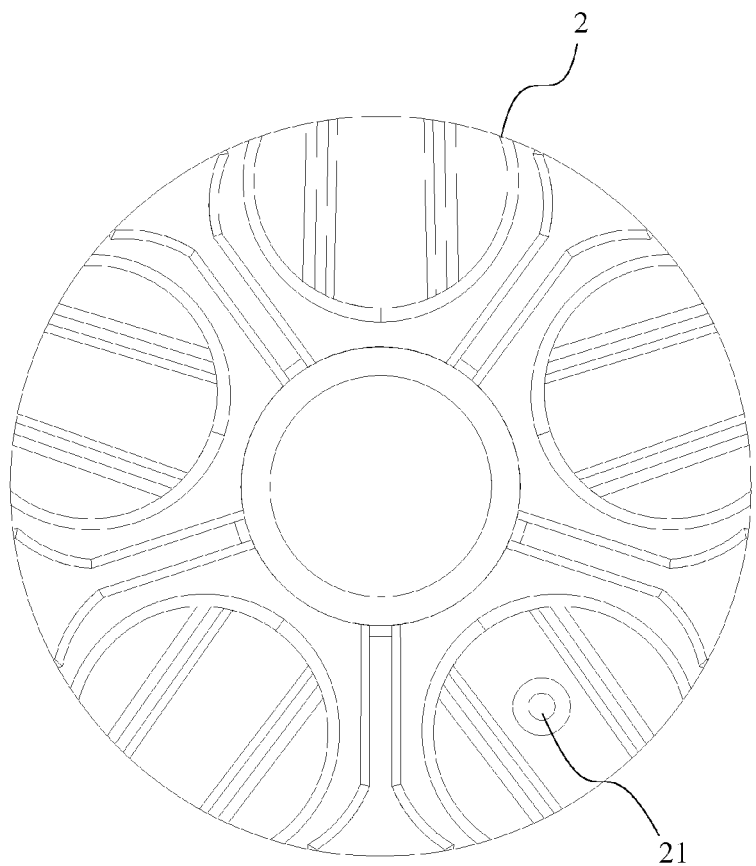
FIG. 5 is a front view of the center cap of the present invention.

In reference to FIG. 3, the plurality of hub securing clips 14 that attaches the central section of the wheel cover 1 to the steel wheel 4 through the hub ring 3 is perimetrically connected around the inner edge 131. More specifically, the plurality of hub securing clips 14 is positioned parallel with the inner edge 131 and perpendicularly positioned with the first securing tab 133 and the second securing tab 134 as the plurality of hub securing clips 14 extends toward the inner lip edge 113. The plurality of flange securing clips 15, which attaches the outer circular section of the wheel cover 1 to the steel wheel 4, is perimetrically connected around the annular protrusion 111 in such way that the plurality of flange securing clips 15 is perpendicularly positioned with the annular protrusion 111 and oppositely positioned from the extended outer lip 112. In reference to FIG. 4 and FIG. 5, the center cap 2, which is concentrically positioned with the central section of the wheel cover 1, comprises a cavity 21. The cavity 21 is perpendicularly traverses through the center cap 2 as the cavity 21 enables the attachment of the center cap 2 to the wheel cover 1. In the preferred embodiment, the center cap 2 is shaped into a circular shape in order to align with the circular shaped central flange 13; however, the center cap 2 can be any other geometric shapes as long as the shape of the center cap 2 matches with the shape of the central flange 13. The center cap 2 can be made from high strength and lightweight materials, such as plastic, composite material, metal or any combination of thereof.

Figure 6:
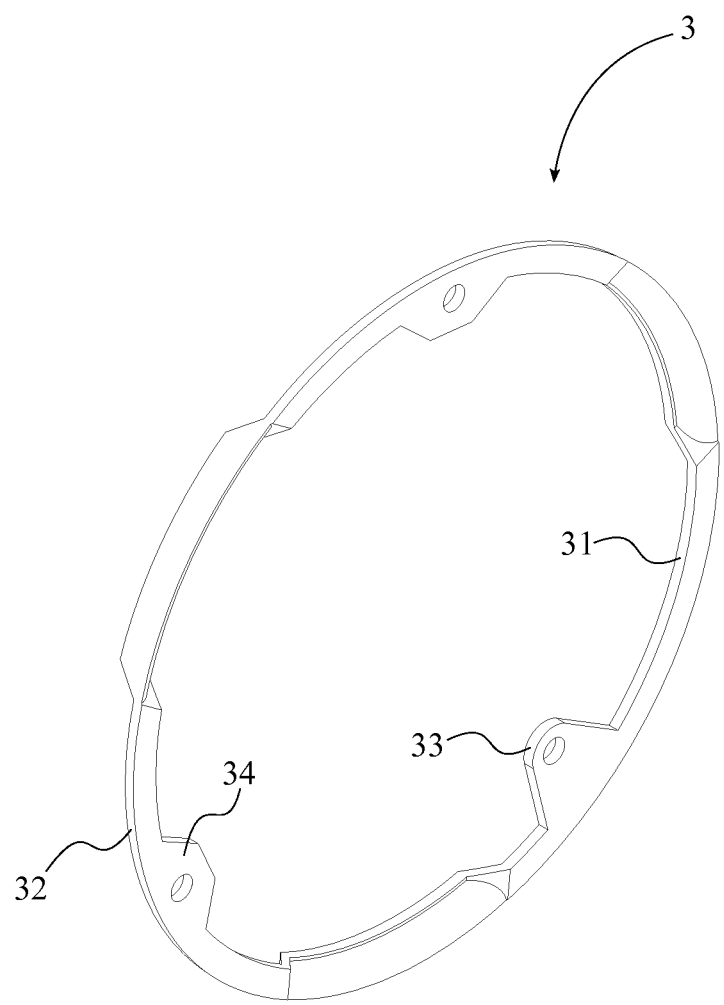
FIG. 6 is a perspective view of the hub ring of the present invention.
Figure 7:
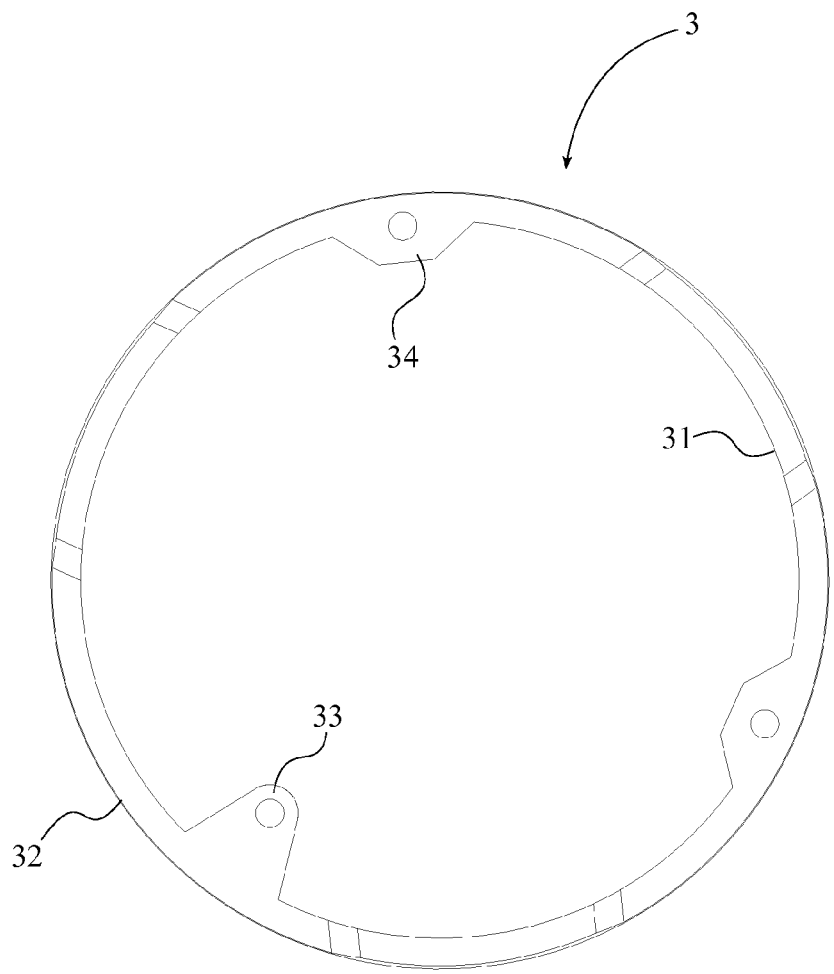
FIG. 7 is a front view of the hub ring of the present invention.

In reference to FIG. 6 and FIG. 7, the hub ring 3, which functions as the intermediate component between the wheel cover 1 and the steel wheel 4, comprises an inner lateral edge 31, an outer lateral edge 32, a cap attachment tab 33, and a cover attachment tab 34. The hub ring 3 can be made from high strength and lightweight materials, such as plastic, composite material, metal or any combination of thereof. The outer lateral edge 32 is positioned concentric with the inner lateral edge 31 as the outer lateral edge 32 and the inner lateral edge 31 complete the body of the hub ring 3. The cap attachment tab 33 is connected to the inner lateral edge 31, where the cap attachment tab 33 is perpendicularly positioned with the inner lateral edge 31. Similarly, the cover attachment tab 34 is connected to the inner lateral edge 31 in such way that the cover attachment tab 34 is perpendicularly positioned with the inner lateral edge 31.

The steel wheel 4 that receives the wheel cover 1, center cap 2, and the hub ring 3 comprises a plurality of rim spokes 41, a hub 42, a flange 43, an outer rim 44, and a tire bead seat 45. The component configuration of the plurality of rim spokes 41, the hub 42, the flange 43, the outer rim 44, and the plurality of groves completes the steel wheel 4 so that the present invention can be properly and efficiently attached with the steel wheel 4. The outer rim 44 comprises a first annular portion 441 and a second annular portion 442, where the first annular portion 441 is concentrically and adjacently positioned with the second annular portion 442. The flange 43 is perimetrically connected within the outer rim 44 as the flange 43 separates the first annular portion 441 and the second annular portion 442. More specifically, the flange 43 is concentrically positioned within the outer rim 44 in such way that the flange 43 is positioned in between the first annular portion 441 and the second annular portion 442. The tire bead seat 45 is internally connected around the first annular portion 441, where the tire bead seat 45 is concentrically positioned with the outer rim 44.

Figure 8:
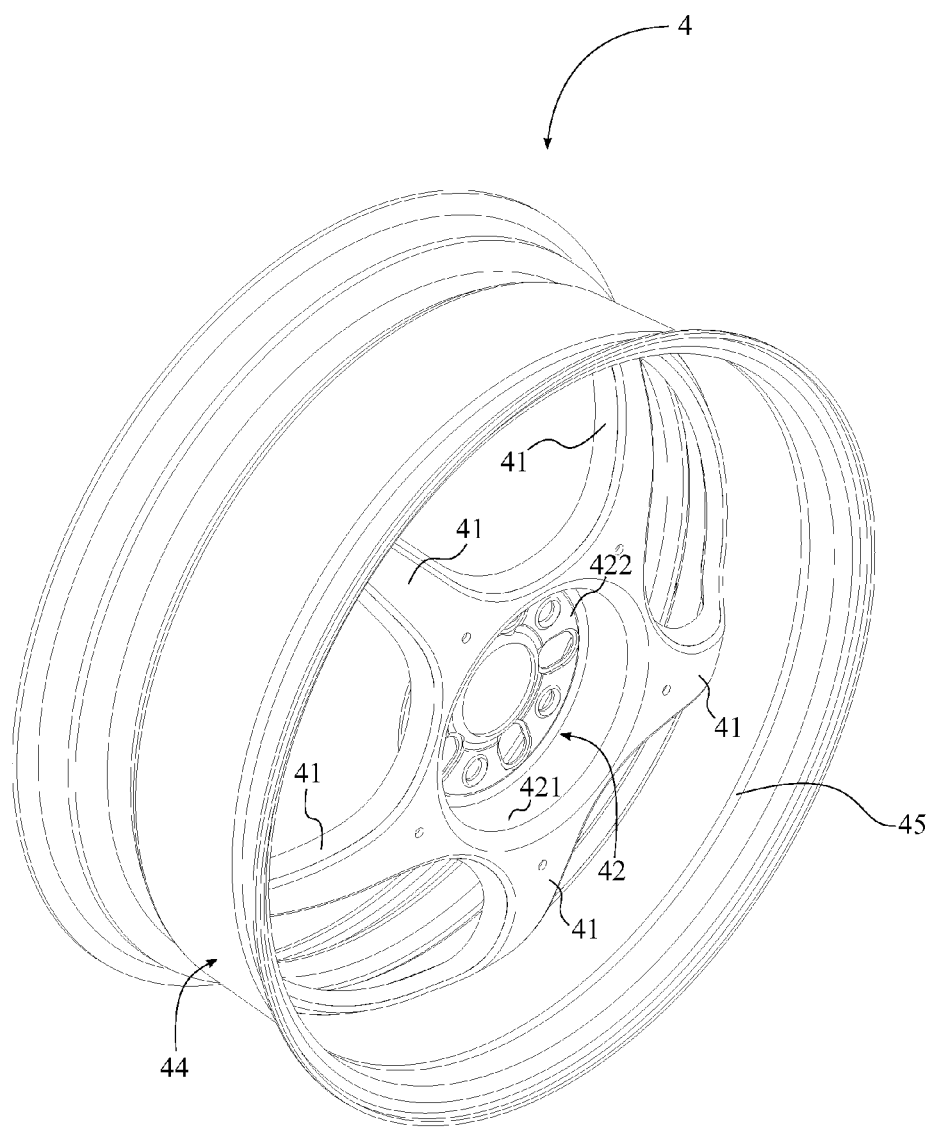
FIG. 8 is a perspective view of the steel wheel of the present invention.
Figure 9:
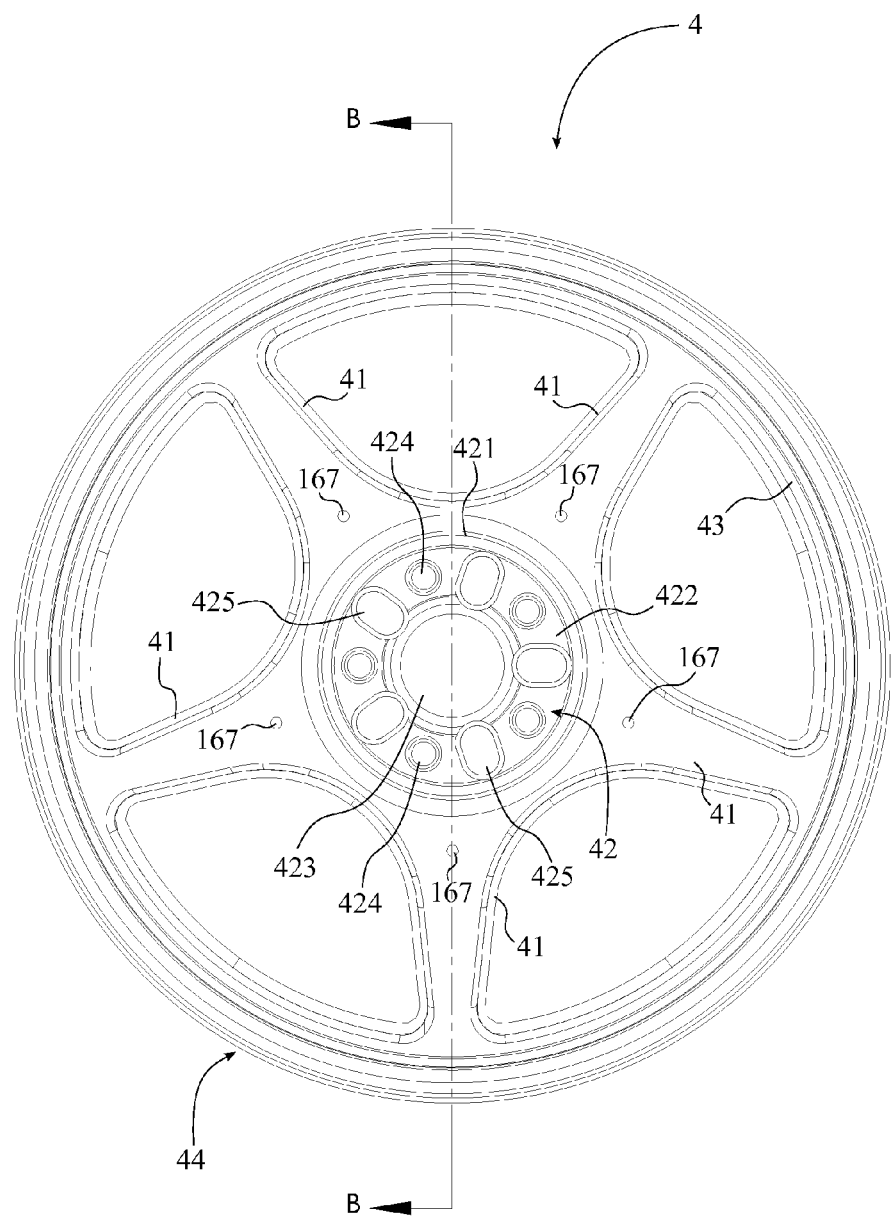
FIG. 9 is a front view of the steel wheel of the present invention, showing the plane upon which a cross sectional view is taken shown in FIG. 10.
Figure 10:
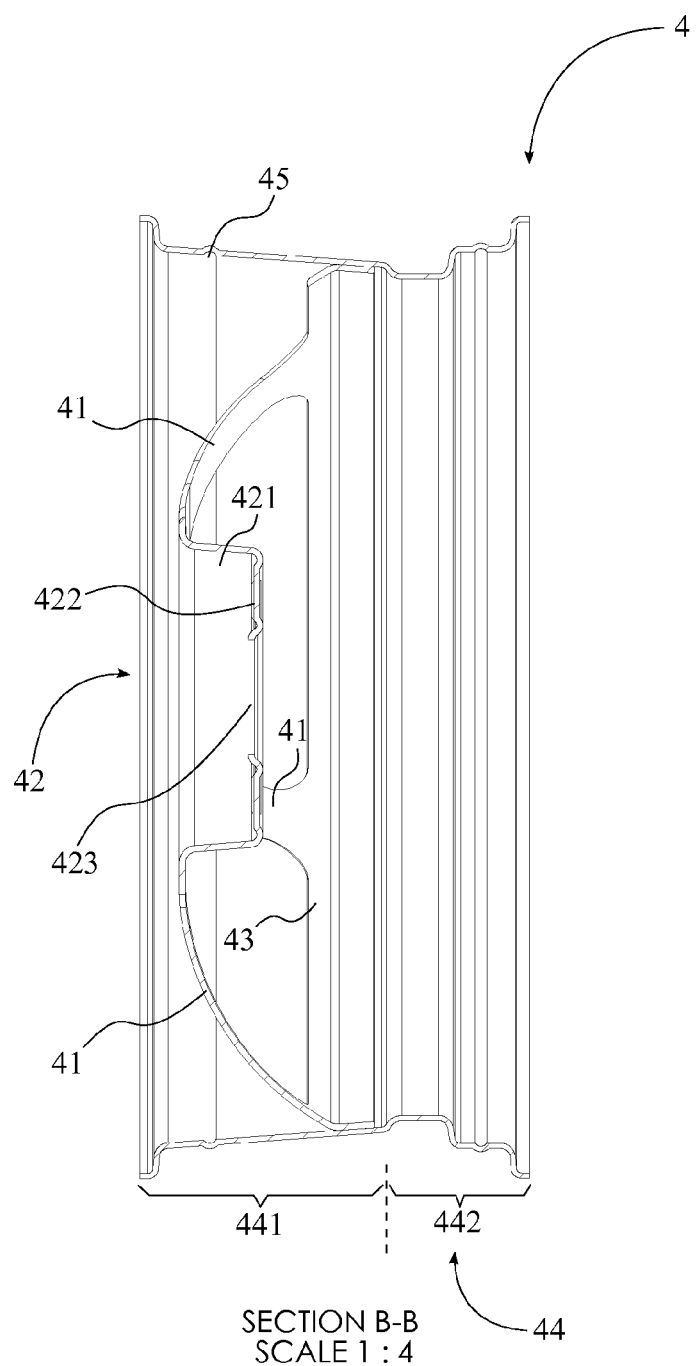
FIG. 10 is a cross section view of the steel wheel taken along line B-B of FIG. 9.
Figure 12:
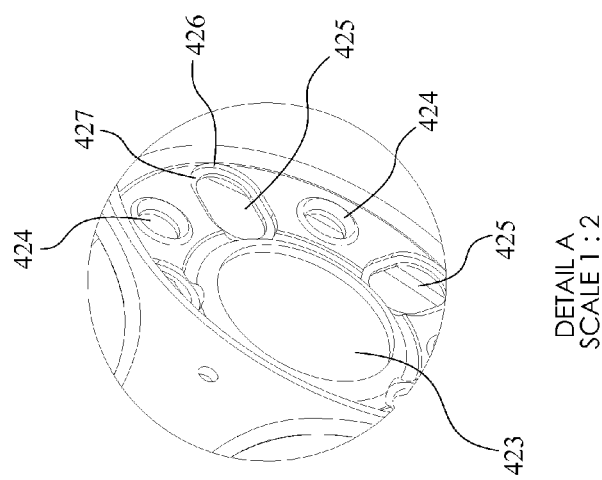
FIG. 12 is a perspective view of the detail section-A of the steel wheel taken within line A of FIG. 11.
Figure 11:
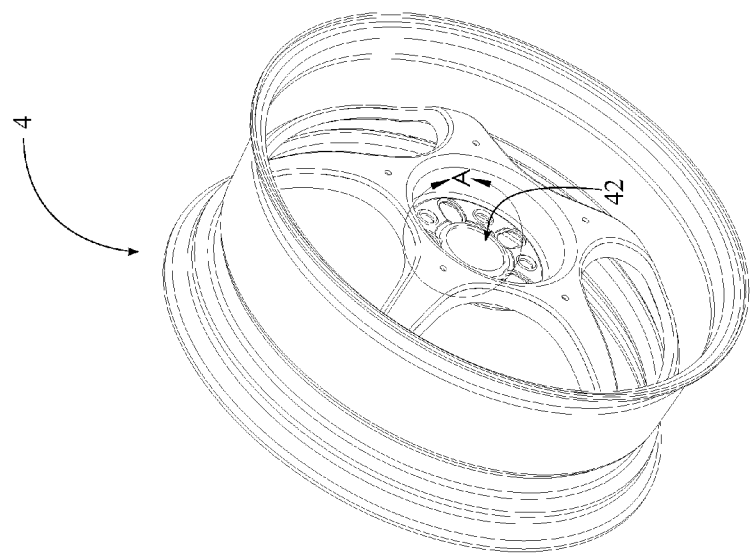
FIG. 11 is a perspective view of the steel wheel of the present invention, wherein the detail section-A is shown in FIG. 12.
Figure 22:
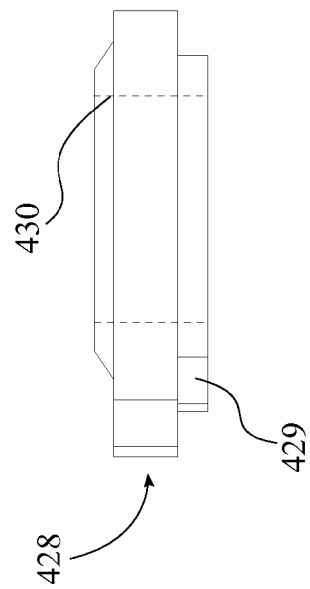
FIG. 22 is a side view of the washer of the present invention, wherein the dash lines illustrate the washer hole.
Figure 21:
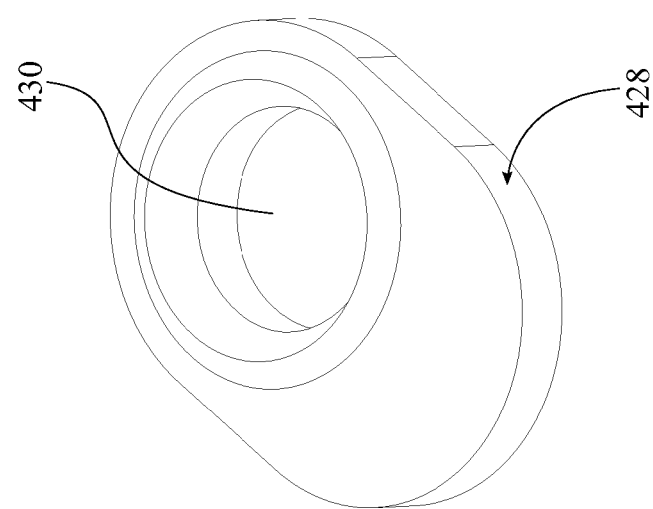
FIG. 21 is a perspective view of the washer of the present invention.

In reference to FIG. 8-FIG. 10, the hub 42 is centrally positioned within the outer rim 44 and comprises a hub rim 421, a hub plate 422, a central opening 423, a plurality of primary lug holes 424, and a plurality of secondary lug holes 425. The hub plate 422 is perimetrically connected within the hub rim 421 completing the body of the hub 42. The central opening 423 is traversed through the hub plate 422 as the central opening 423 is concentrically positioned with the hub plate 422. The plurality of primary lug holes 424 is perimetrically positioned around the central opening 423 and traversed through the hub plate 422 in order to accept a standard bolt pattern of a wheel hub assembly. The plurality of secondary lug holes 425 is also perimetrically positioned around the central opening 423 and traversed through the hub plate 422 so that the plurality of secondary lug holes 425 can accept an alternative bolt pattern of a different wheel hub assembly. The plurality of primary lug holes 424 and the plurality of secondary lug holes 425 enable the steel wheel 4 to attach with different bolt patterns as the plurality of secondary lug holes 425 is interspaced in between the plurality of primary lug holes 424. While the plurality of primary lug holes 424 accepts the standard bolt pattern without any modifications, each of the plurality of secondary lug holes 425 that comprises an inner lug surface 426 and an offset step 427 requires a washer 428 in order to accept the alternative bolt pattern. As shown in FIG. 11 and FIG. 12, the offset step 427 is perimetrically and perpendicularly connected within the inner lug surface 426 so that the washer 428 can be perimetrically positioned within the offset step 427 and the inner lug surface 426. In reference to FIG. 14, FIG. 21, and FIG. 22, a washer offset 429 of the washer 428 is positioned flush with the offset step 427 creating a secured connection between each of the plurality of secondary lug holes 425 and the washer 428. The washer 428 further comprises a tapered end and a washer hole 430, where the tapered end is oppositely positioned from the washer offset 429 while the washer hole 430 traverses through the tapered end and the washer offset 429. The plurality of secondary lug holes 425 and the washer 428 accept the alternative bolt pattern through the washer holes 430 while the tapered end further strengthen the washer hole 430 within each of the plurality of secondary lug holes 425. The plurality of rim spokes 41 is radially connected in between the hub rim 421 and the flange 43, where the plurality of rim spokes 41 functions as the radial supports of the steel wheel 4.

Figure 13:
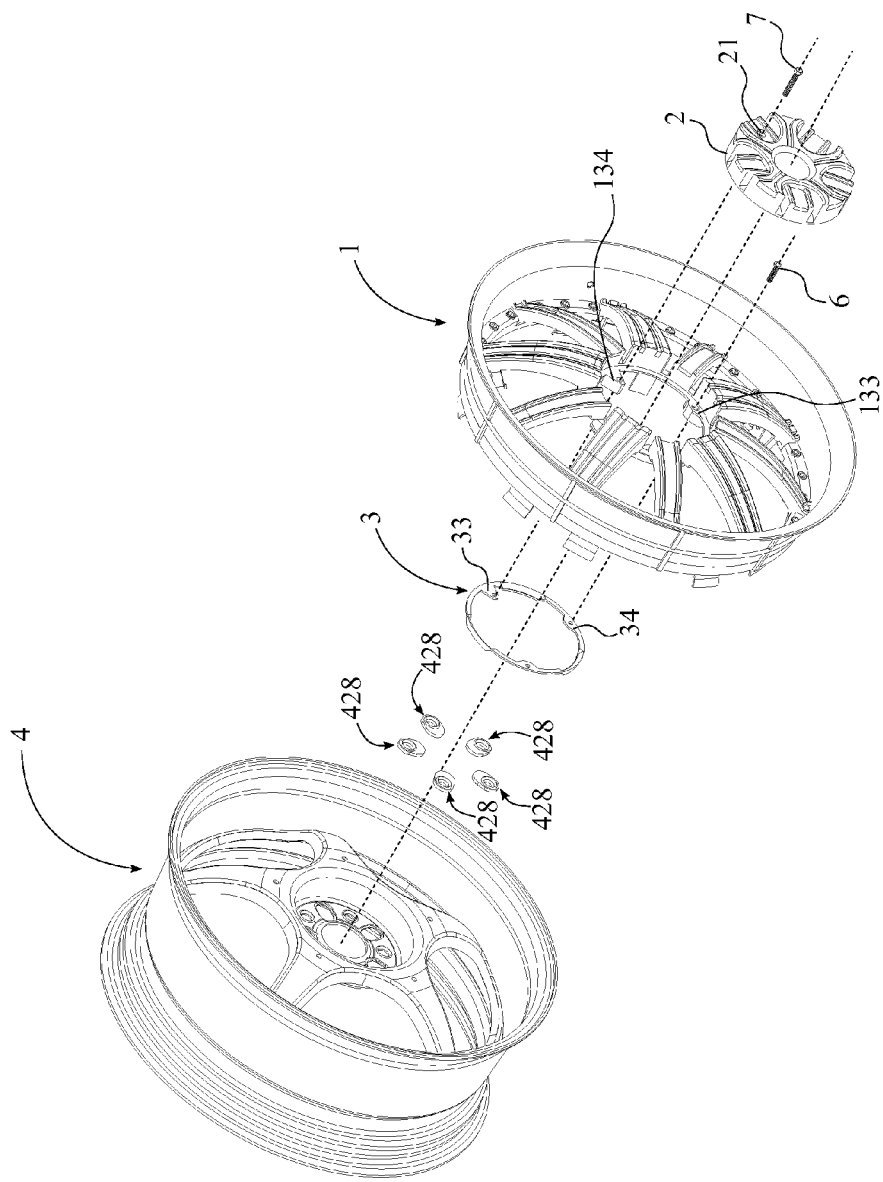
FIG. 13 is an exploded perspective view of the present invention with the steel wheel.
Figure 14:
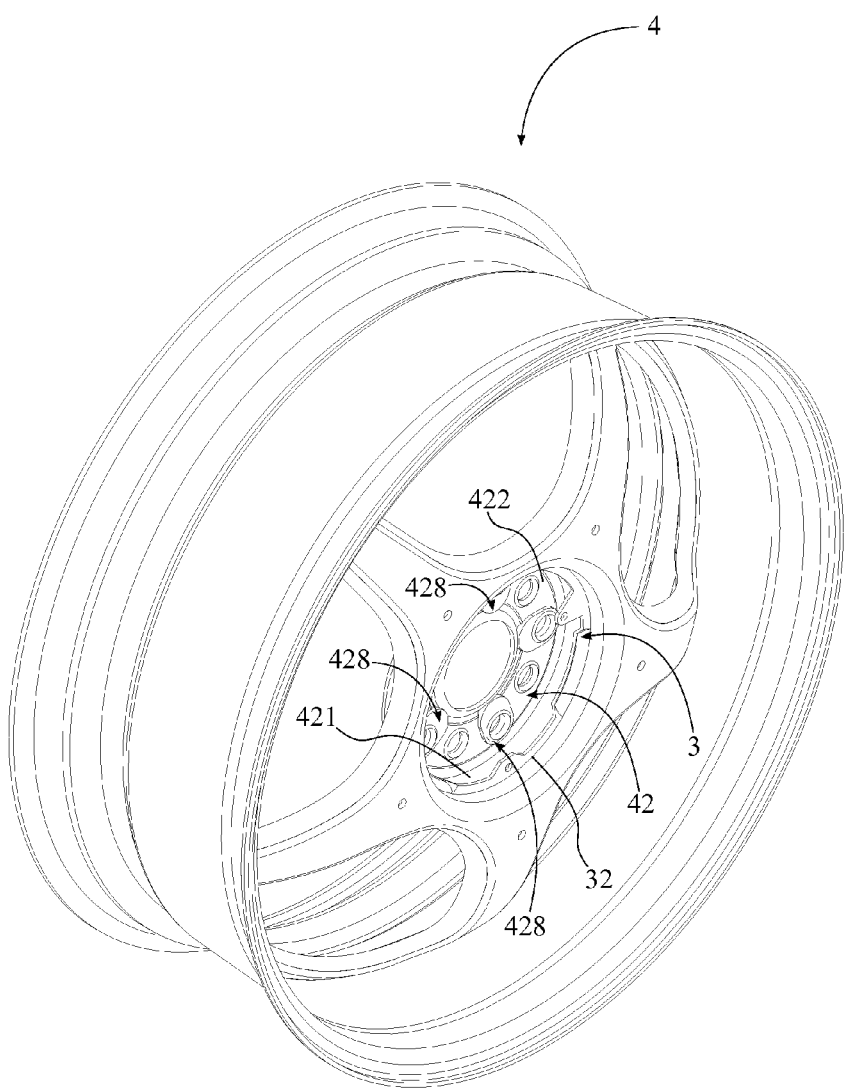
FIG. 14 is a perspective view of the steel wheel with the hub ring.
Figure 15:
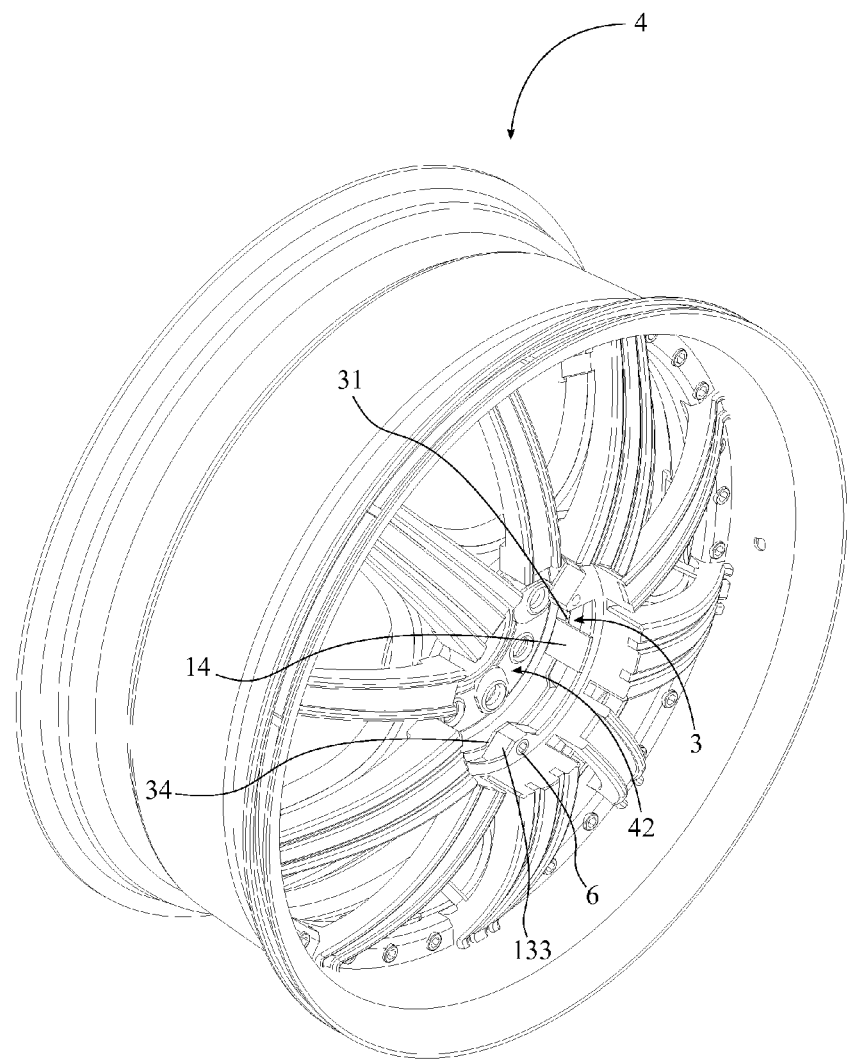
FIG. 15 is a perspective view of the steel wheel with the hub ring and the wheel cover.

In order to properly install the present invention with the steel wheel 4, the hub ring 3 needs to be connected to the steel wheel 4 before installing the wheel cover 1. As shown in FIG. 13 and FIG. 14, the outer lateral edge 32 is adjacently connected with the hub rim 421 opposite of the hub plate 422. The outer lateral edge 32 is welded to the hub rim 421 as the preferred method of connection so that the steel wheel 4 and the hub ring 3 can be connected to each other; however, the users of the present invention can utilize any type of adhesive methods, any type of adhesive materials, and any other type secured connection methods to connect the outer lateral edge 32 with the hub rim 421. In reference to FIG. 15-FIG. 17, once the hub ring 3 is fully secured within the hub rim 421, the users can install the wheel cover 1 of the present invention. When the wheel cover 1 is attached to the steel wheel 4, the extended outer lip 112, the annular protrusion 111, and the plurality of cover spokes 12 of the wheel cover 1 respectively cover the first annular portion 441, the flange 43, and the plurality of rim spokes 41 of the steel wheel 4. More specifically, the central section of the wheel cover 1 is attached to the steel wheel 4 through the plurality of hub securing clips 14 as the plurality of hub securing clips 14 attaches around the inner lateral edge 31. The outer circular section of the wheel cover 1 is attached to the steel wheel 4 through the plurality of flange securing clips 15 as the plurality of flange securing clips 15 attaches with the flange 43. The first securing tab 133 is attached with the cover attachment tab 34 by a first fastener 6 so that the central section can be further secured with the steel wheel 4. When the first securing tab 133 and the cover attachment tab 34 are attached to the each other through the first fastener 6, the plurality of ribs 115 is pressed against the first annular portion 441, securing the outer circular section of the wheel cover 1. Additionally, the annular locking ring 116 engages with the tire bead seat 45 further securing the outer circular section of the wheel cover 1, wherein the engagement between the annular locking ring 116 and the tire bead seat 45 is shown within FIG. 19 and FIG. 20. The wheel cover 1 also utilizes the plurality of fastening systems 16 to obtain additional attachments between the wheel cover 1 and the steel wheel 4, where the plurality of fastening systems 16 comprises a plurality of bracket attachment systems 161, a plurality of clip attachment systems 164, a plurality of spoke attachment systems 166, and a plurality of magnetic attachment systems 170.

Figure 18:
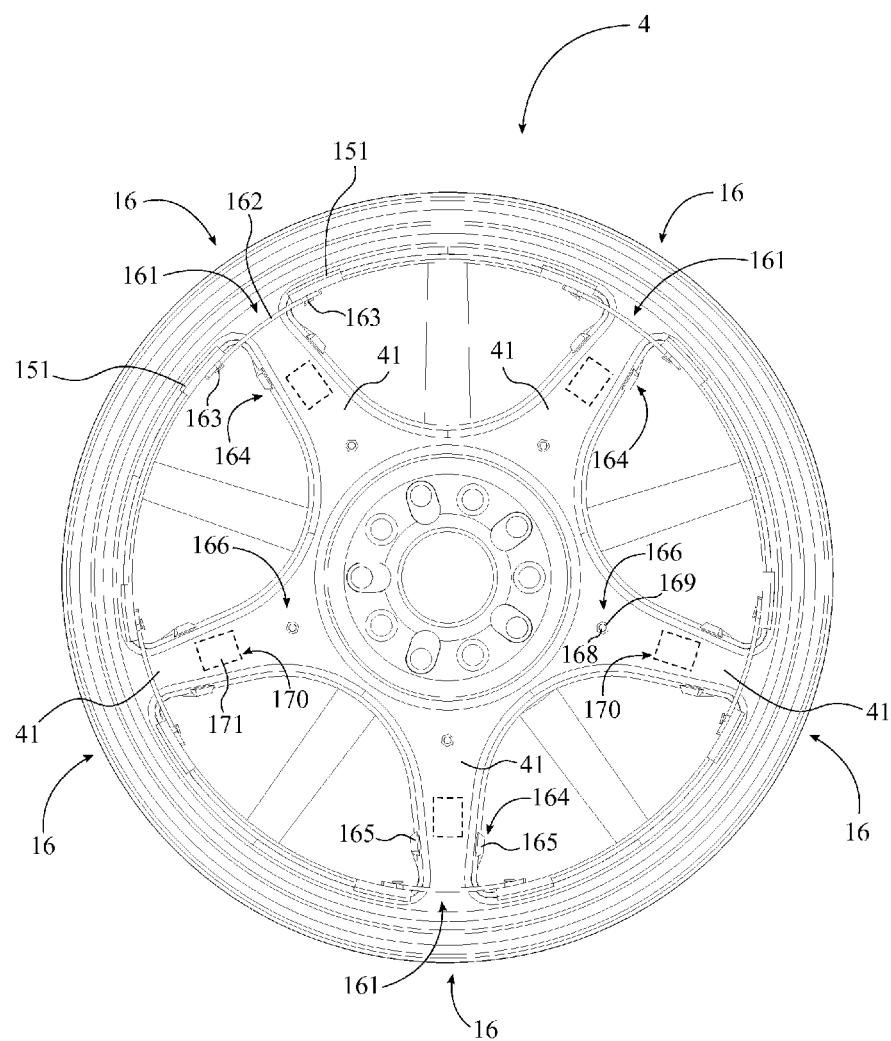
FIG. 18 is a back view of the steel wheel with the wheel cover, showing the plurality of fastening systems and the dash lines illustrate the magnets.

In reference to FIG. 18, each of the plurality of bracket attachment systems 161 comprises a locking bracket 162, a pair of bracket fasteners 163, and a pair of clips 151 from the plurality of flange securing clips 15. The locking bracket 162 is adjacently positioned with the pair of clips 151 in such way that the locking bracket 162 and the pair of clips 151 enclose one of the plurality of rim spokes 41. Then the locking bracket 162 is attached to the pair of clips 151 by the pair of bracket fasteners 163, securing the locking bracket 162 to the pair of clips 151.

In reference to FIG. 18, each of the plurality of clip attachment systems 164 comprises a pair of snap-clips 165, where the pair of snap-clips 165 is connected on one of the plurality of cover spokes 12. The pair of snap-clips 165 attaches with one of the plurality of rim spokes 41 in such way that the plurality of clip attachment systems 164 creates individual attachments in between the plurality of cover spokes 12 and the plurality of rim spokes 41.

In reference to FIG. 9 and FIG. 18, each of the plurality of spoke attachment systems 166 comprises a locking hole 167, a first fastener portion 168, and a second fastener portion 169. The locking hole 167 is traversed through one of the plurality of rim spokes 41 in order to accept the first fastener portion

168. More specifically, the first fastener portion 168 is connected with one of the plurality of cover spokes 12 and inserted through the locking hole 167 during the installation of the wheel cover 1. Then the first fastener portion 168 is concentrically positioned within the locking hole 167 and extends toward the inner lip edge 113. The second fastener portion 169 is attached with the first fastener portion 168 opposite of the plurality of cover spokes 12 as the second fastener portion 169 is adjacently positioned with the plurality of rim spokes 41. As a result, the first fastener portions 168 and the second fastener portions 169 create secured attachments in between the plurality of cover spokes 12 and the plurality of rim spokes 41.

In reference to FIG. 18, each of the plurality of magnetic attachment systems 170 comprises a magnet 171, where the magnet 171 is connected with one of the plurality of cover spokes 12. The magnet 171 magnetically attaches with one of the plurality of rim spokes 41 so that the plurality of magnetic attachment systems 170 is able to provide additional attachments in between the wheel cover 1 and the steel wheel 4.

Figure 16:
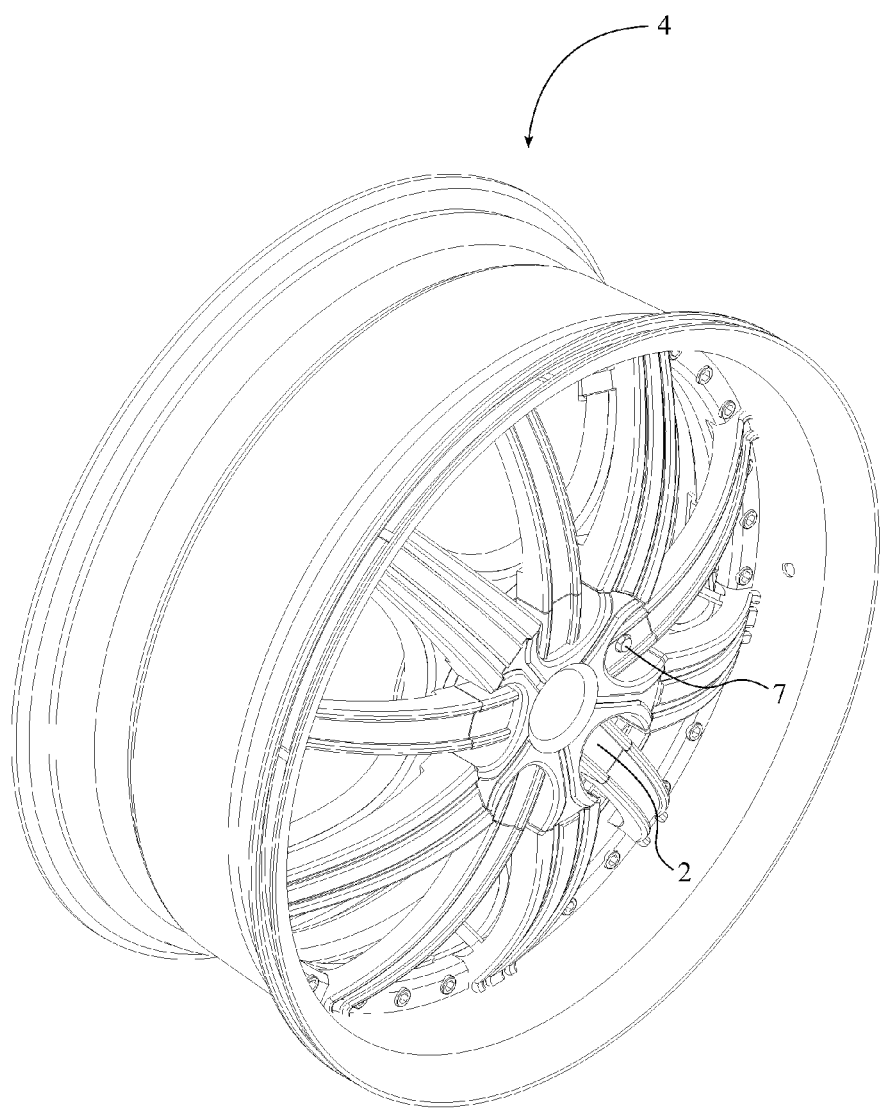
FIG. 16 is a perspective view of the steel wheel with the wheel cover, and the center cap.
Figure 17:
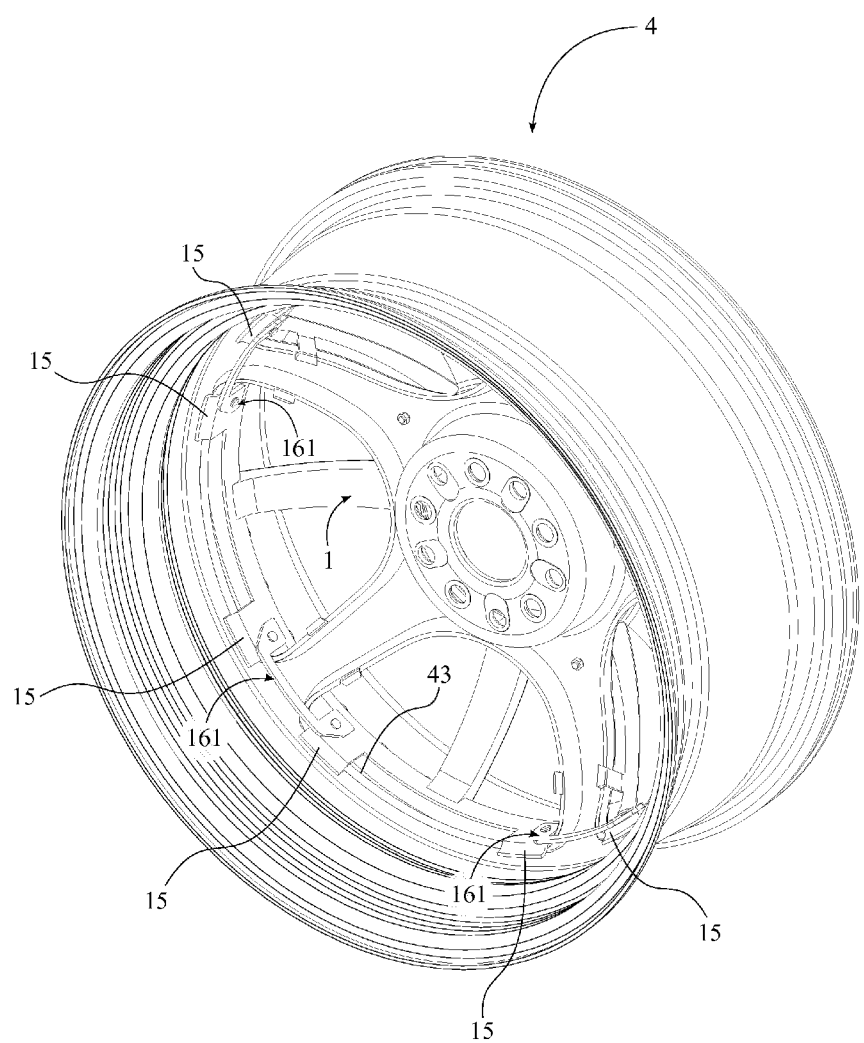
FIG. 17 is a back perspective view of the steel wheel with the wheel cover.

In reference to FIG. 16, once the wheel cover 1 is fully attached with the steel wheel 4 and the hub ring 3, the center cap 2 is attached to the wheel cover 1 through the hub ring 3. More specifically, the center cap 2 is centrally positioned within the plurality of cover spokes 12 and concentrically positioned with the central flange 13 so that the center cap 2 can be pressed against the central flange 13. The cavity 21 is aligned with the cap attachment tab 33 in order to attach the center cap 2 with the hub ring 3 through a second fastener 7. In reference to FIG. 19 and FIG. 20, the second fastener 7 is inserted through the cavity 21 and the second securing tab 134 before the second fastener 7 is attached with the cap attachment tab 33 so that the second fastener 7 can secure both the center cap 2 and the wheel cover 1.

Although the invention has been explained in relation to its preferred embodiment, it is to be understood that many other possible modifications and variations can be made without departing from the spirit and scope of the invention as hereinafter claimed.

What is claimed is:

1. A deep-lip wheel cover for a deep-lip wheel rim comprises:
    a wheel cover;
    a center cap;
    a hub ring;
    the wheel cover comprises a brim, a plurality of cover spokes, a central flange, a plurality of hub securing clips, a plurality of flange securing clips, and a plurality of fastening systems;
    the plurality of cover spokes being radially connected around the central flange;
    the brim being concentrically positioned around the central flange and being connected around the plurality of cover spokes;
    the center cap and the hub ring being concentrically positioned with the wheel cover;
    the wheel cover being mounted against the hub ring;
    the center cap being mounted onto the central flange opposite the hub ring;
    the brim comprises an annular protrusion, an extended outer lip, an inner lip edge, a valve stem hole, a plurality of ribs, and an annular locking ring;
    the central flange comprises an inner edge, an outer edge, a first securing tab, and a second securing tab;
    the center cap comprises a cavity; and
    the hub ring comprises an inner lateral edge, an outer lateral edge, a cap attachment tab, and a cover attachment tab.

2. The deep-lip wheel cover for a deep-lip wheel rim as claimed in claim 1 comprises:
    the annular protrusion being concentrically positioned within the extended outer lip;
    the annular protrusion being perpendicularly positioned with the extended outer lip;
    the annular protrusion being perimetrically connected to the extended outer lip adjacent to the inner lip edge;
    the valve stem hole traversing through the extended outer lip;
    the plurality of ribs being externally and radially connected around the extended outer lip;
    the annular locking ring being concentrically positioned with the extended outer lip; and
    the annular locking ring being externally connected around the extended outer lip and the plurality of ribs.

3. The deep-lip wheel cover for a deep-lip wheel rim as claimed in claim 1 comprises:
    the central flange being concentrically positioned within the extended outer lip;
    the inner edge being concentric to the outer edge;
    the first securing tab being perpendicularly positioned with the inner edge;
    the first securing tab being adjacently connected to the inner edge;
    the second securing tab being perpendicularly positioned with the inner edge; and
    the second securing tab being adjacently connected to the inner edge.

4. The deep-lip wheel cover for a deep-lip wheel rim as claimed in claim 1 comprises:
    the plurality of cover spokes being radially connected in between the outer edge and the annular protrusion.

5. The deep-lip wheel cover for a deep-lip wheel rim as claimed in claim 1 comprises:
    the plurality of hub securing clips being perimetrically connected around the inner edge;
    the plurality of hub securing clips being positioned parallel with the inner edge;
    the plurality of hub securing clips being perpendicularly positioned with the first securing tab and the second securing tab; and
    the plurality of hub securing clips being extended toward the inner lip edge.

6. The deep-lip wheel cover for a deep-lip wheel rim as claimed in claim 1 comprises:
    the plurality of flange securing clips being perimetrically connected around the annular protrusion;
    the plurality of flange securing clips being perpendicularly positioned with the annular protrusion; and
    the plurality of flange securing clips being oppositely positioned from the extended outer lip.

7. The deep-lip wheel cover for a deep-lip wheel rim as claimed in claim 1 comprises:
    the cavity perpendicularly traversing through the center cap.

8. The deep-lip wheel cover for a deep-lip wheel rim as claimed in claim 1 comprises:
    the outer lateral edge being concentric to the inner lateral edge;
    the cap attachment tab being connected to the inner lateral edge;
    the cap attachment being perpendicularly positioned with the inner lateral edge;

the cover attachment tab being connected to the inner lateral edge; and the cover attachment tab being perpendicularly positioned with the inner lateral edge.

9. The deep-lip wheel cover for a deep-lip wheel rim as claimed in claim 1 comprises:

a steel wheel;

the steel wheel comprises a plurality of rim spokes, a hub, a flange, an outer rim, and a tire bead seat;

the hub comprises a hub rim, a hub plate, a central opening, a plurality of primary lug holes, and a plurality of secondary lug holes;

the outer rim comprises a first annular portion and a second annular portion;

each of the plurality of secondary lug holes comprises a washer, an inner lug surface and an offset step; and the plurality of fastening systems comprises a plurality bracket attachment systems, a plurality clip attachment systems, a plurality spoke attachment systems, and a plurality of magnetic attachment systems.

10. The deep-lip wheel cover for a deep-lip wheel rim as claimed in claim 9 comprises:

the first annular portion being concentrically and adjacently positioned with the second annular portion;

the flange being concentrically positioned within the outer rim;

the flange being positioned in between the first annular portion and the second annular portion;

the flange being perimetrically connected within the outer rim;

the tire bead seat being internally connected around the first annular portion; and the tire bead seat being concentrically positioned with the outer rim.

11. The deep-lip wheel cover for a deep-lip wheel rim as claimed in claim 9 comprises:

the hub plate being perimetrically connected within the hub rim;

the central opening traversing through the hub plate;

the central opening being concentrically positioned with the hub plate;

the plurality of primary lug holes being perimetrically positioned around the central opening;

the plurality of primary lug holes traversing through the hub plate;

the plurality of secondary lug holes being perimetrically positioned around the central opening;

the plurality of secondary lug holes traversing through the hub plate;

the plurality of secondary lug holes being interspersed in between the plurality of primary lug holes;

the offset step being perpendicularly and perimetrically connected within the inner lug surface; and the washer being perimetrically positioned within the offset step and the inner lug surface.

12. The deep-lip wheel cover for a deep-lip wheel rim as claimed in claim 9 comprises:

the plurality of rim spokes being radially connected in between the hub rim and the flange; and the plurality bracket attachment systems, the plurality clip attachment systems, the plurality spoke attachment systems, and the plurality of magnetic attachment systems being radially positioned around the hub rim.

13. The deep-lip wheel cover for a deep-lip wheel rim as claimed in claim 9 comprises:

the outer lateral edge being adjacently connected with the hub rim opposite from the hub plate;

the plurality of hub securing clips being attached to the inner lateral edge;

the plurality of flange securing clips being attached to the flange;

the plurality of ribs being pressed against the first annular portion;

the annular locking ring being engaged with the tire bead seat;

the first securing tab being attached with the cover attachment tab by a first fastener;

the center cap being concentrically positioned with the central flange;

the center cap being pressed against the central flange;

the center cap being centrally positioned within the plurality of cover spokes; and the center cap being attached with the cap attachment tab by a second fastener.

14. The deep-lip wheel cover for a deep-lip wheel rim as claimed in claim 12, wherein the second fastener is inserted through the cavity and the second securing tab.

15. The deep-lip wheel cover for a deep-lip wheel rim as claimed in claim 12 comprises:

the first annular portion being covered by the extended outer lip;

the flange being covered by the annular protrusion; and the plurality of rim spokes being covered by the plurality of cover spokes.

16. The deep-lip wheel cover for a deep-lip wheel rim as claimed in claim 9 comprises:

each of the plurality of bracket attachment systems comprises a locking bracket, a pair of bracket fasteners, and a pair of clips from the plurality of flange securing clips;

the locking bracket being adjacently positioned with the pair of clips; and the locking bracket being attached to the pair of clips by the pair of bracket fasteners.

17. The deep-lip wheel cover for a deep-lip wheel rim as claimed in claim 9 comprises:

each of the plurality of clip attachment systems comprises a pair of snap-clips;

the pair of snap-clips being connected on one of the plurality of cover spokes; and the pair of snap-clips being attached to one of the plurality of rim spokes.

18. The deep-lip wheel cover for a deep-lip wheel rim as claimed in claim 9 comprises:

each of the plurality of spoke attachment systems comprises a locking hole, a first fastener portion, and a second fastener portion;

the locking hole traversing through one of the plurality of rim spokes;

the first fastener portion being connected with one of the plurality of cover spokes;

the first fastener being extended toward the inner lip edge;

the first fastener portion being concentrically positioned within the locking hole;

the second fastener portion being attached with the first fastener portion opposite of the plurality of cover spokes; and the second fastener portion being adjacently positioned with the plurality of rim spokes.

19. The deep-lip wheel cover for a deep-lip wheel rim as claimed in claim 9 comprises:

each of the plurality of magnetic attachment systems comprises a magnet;

the magnet being connected with one of the plurality of cover spokes; and the magnet being attached with one of the plurality of rim spokes.

20. The deep-lip wheel cover for a deep-lip wheel rim as claimed in claim 9 comprises:
   the plurality of primary lug holes being connected with a wheel hub assembly.

21. The deep-lip wheel cover for a deep-lip wheel rim as claimed in claim 9 comprises:
   the plurality of secondary lug holes being connected with a wheel hub assembly.

\* \* \* \* \*